United States Patent
Stanton et al.

(10) Patent No.: US 6,246,771 B1
(45) Date of Patent: *Jun. 12, 2001

(54) SESSION KEY RECOVERY SYSTEM AND METHOD

(75) Inventors: Leroy K. Stanton, Potomac, MD (US); Steven R. Wright, Reston, VA (US); Christopher T. Brook, Chevy Chase; Russell F. Loane, Odenton, both of MD (US)

(73) Assignee: V-One Corporation, Germantown, MD (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/980,064

(22) Filed: Nov. 26, 1997

(51) Int. Cl.[7] .................................................. H04L 9/00
(52) U.S. Cl. ................................................... 380/286
(58) Field of Search ........................................ 380/48, 286

(56) References Cited

U.S. PATENT DOCUMENTS

| | | | |
|---|---|---|---|
| 4,941,176 | * | 7/1990 | Matyas et al. .......................... 380/21 |
| 5,280,527 | * | 1/1994 | Gullman et al. ........................ 380/23 |
| 5,349,643 | * | 9/1994 | Cox et al. ............................... 380/25 |
| 5,590,199 | * | 12/1996 | Krajewski, Jr. et al. ............... 380/21 |
| 5,602,918 | * | 2/1997 | Chen et al. ............................. 380/21 |
| 5,708,714 | * | 1/1998 | Lopez et al. ........................... 380/25 |
| 5,737,419 | * | 4/1998 | Ganesan ................................. 380/21 |
| 5,761,305 | * | 6/1998 | Vanstone et al. ...................... 380/21 |
| 5,764,789 | * | 6/1998 | Pare, Jr. et al. ...................... 382/115 |
| 5,764,887 | * | 6/1998 | Kells et al. ........................... 713/200 |
| 5,835,596 | * | 11/1998 | Klemba et al. ........................ 380/25 |
| 5,841,865 | * | 11/1998 | Sudia .................................... 380/21 |
| 5,850,451 | * | 12/1998 | Sudia .................................... 380/49 |
| 5,852,665 | * | 12/1998 | Gressel et al. ........................ 380/21 |
| 5,857,022 | * | 1/1999 | Sudia .................................... 380/23 |
| 5,872,849 | * | 2/1999 | Sudia .................................... 380/49 |
| 5,907,618 | * | 5/1999 | Gennaro et al. ...................... 380/21 |
| 5,920,630 | * | 7/1999 | Wertheimer et al. ................. 380/25 |
| 6,058,188 | * | 5/2000 | Chandersekaran et al. .......... 380/25 |

OTHER PUBLICATIONS

Schneier, Bruce, Applied Cryptography, 1996, 43 and 513–516.*

* cited by examiner

*Primary Examiner*—Tod Swann
*Assistant Examiner*—Douglas Meislahn
(74) *Attorney, Agent, or Firm*—Bacon & Thomas, PLLC

(57) ABSTRACT

A system and method for providing access to an encrypted communication involves recording the session during which the communication is encrypted, replaying the session to recover data used to recover a session key, accessing a server to retrieve secret information also used to generate the session key, and recreating the session key using the recovered data and secret information. The system and method includes provision for authenticating parties to the key recovery, protecting communications required to retrieve the secret key, and establishing a record of the key recovery to serve as an audit trail.

31 Claims, 3 Drawing Sheets

SESSION KEY RECOVERY SYSTEM AND METHOD

BACKGROUND OF THE INVENTION

1. Field of the Invention

This invention relates to an encryption system and method, and in particular to a system and method for recovering a session key so as to provide access by an authorized third party to data encrypted by the session key, the system and method being capable of use with a variety of strong encryption software, thereby enabling the strong encryption software to comply with U.S. encryption technology export restrictions.

The invention also relates to procedures for ensuring that only certified parties will have access to the recreated session keys and decrypted data, thereby protecting the privacy of all non-suspect communications utilizing the subject software, as well as of the information contained in the suspect communications.

2. Description of Related Art

The principal problem addressed by the invention is the problem of providing strong encryption software to protect sensitive communications while affording legal authorities access to the communications in order to comply with U.S. Government regulations concerning the export of encryption software.

Export of encryption products from the United States of America is controlled by the U.S. Government's Bureau of Export Administration (BXA) in the Commerce Department. In December of 1996, the rules for export of encryption products were modified so that it became possible, in some circumstances, for U.S. manufacturers of encryption products to ship software/hardware components that utilize "strong" encryption algorithms, i.e., symmetric algorithms with key sizes larger than 56 bits, so long as recovery of the encrypted data, or the keys protecting the data, were available to law enforcement agents to satisfy investigatory requirements.

The mechanisms anticipated by the government that would satisfy the regulations were generally classified as "Trusted Third Party" services, wherein a separate organization would provide escrow, or recovery services, to customers wishing to employ strong encryption to protect electronic commerce transactions, the customers being required to prepend to the file an encrypted version of the session key so as to enable recovery by a third party in possession of the key necessary to decrypt the encrypted session key. However, the regulations also left open the possibility that an organization could perform its own escrow services, i.e., provide for recovery of session keys by decrypting the "key recovery keys" or law enforcement fields containing the keys, if safeguards concerning certification of the parties involved in the escrow services could be implemented, so as to meet the requirements without potentially exposing data to a third party.

The present invention takes another approach, which permits the organization to manage its own key recovery services, but which is fundamentally different from prior third or first party escrow approaches in that modification of the encryption software to provide for a key recovery key or law enforcement field is not required. Instead of providing for recovery of an encrypted session key through the use of a key recovery or escrow agent with the ability to decrypt the key recovery key, the present invention recreates the original key exchange process with the assistance of the authentication server to recover the session key based on a recording of clear text or non-encrypted data exchanged during the handshaking procedure by which the original session key was generated.

Like the escrow approach, the system and method of the invention can be applied to situations in which a communication contains data encrypted by a session key unique to the communication. The system and method of the invention utilizes the property of certain encryption systems, to which the present invention is applicable, that a recording of the suspect communication, which can be made without the knowledge of the parties to the communication using wiretapping and similar methods, will include all information necessary to generate the session key, including clear text session-specific values in the case of a shared secret key encryption protocol, or the original key exchange ticket in the case of public/private key cryptosystem based key exchange procedures. Where the shared secret key used to generate the session key, or the private key used to decrypt a session key contained in a recorded key exchange or authorization ticket is held in a database protected by an authentication server, access to the shared secret key or private key can easily be provided by a secured communications link to the server.

Significantly, unlike the previously proposed escrow approaches, the present invention also has the advantage that it can be implemented without modifying the underlying encryption software, there being no need to modify the software to generate the key recovery key, law enforcement field of a transmission, or the like, which eliminates the possibility of tampering by the parties to the suspect communication, and enables the method and system of the invention to be adapted for use with a wide variety of existing encryption software, including software already being marketed in the U.S. but not otherwise exportable.

Despite the capability of recovering session keys used in strong encryption systems, the system and method of the invention is capable of being implemented using simple Windows™ based software running on a laptop or notebook computer, in conjunction with a smartcard reader or similar device, and can be provided by the vendor to the customer or licensee in the form of a software and hardware "kit," upon BXA approval, which involves certification of the various persons responsible for the key recovery functions, and does not require any modification of the basic encryption system to which access is required, allowing a variety of existing strong encryption software to be approved for export simply by licensing the encryption software with the appropriately adapted "kit" and certifying appropriate personnel of the customer.

As indicated above, the invention is to be distinguished from prior key recovery methods, such as the ones described in copending U.S. Ser. No. 08/892,947, assigned to V-One Corporation, and in U.S. Pat. Nos. 5,557,346 and 5,557,765, assigned to Trusted Information Systems, which involve encrypting the session key by means of the public key of a public/private key cryptosystem, the private key to which is held by the key recovery agent in order to permit the session key to be recovered, and prepending the resulting "key recovery key" or "law enforcement access field" to the encrypted file or transmission.

Because, unlike third party escrow-based session key recover methods, the present invention requires that the key recovery agent request the authentication server to again generate the session key, the present invention also relates to ensuring that the key recovery agent is properly certified and authenticated, and that all communications involving retrieval of session keys, or information protected thereby, are properly secured.

It will be appreciated that the invention can be used in connection with any system or method in which the session key is generated by an exchange of clear text data between clients, and in which the secret or private keys used to generate the session key based on the clear text data are stored at a location and in a manner accessible to the customer. An example of such a system is the SmartGate™ system offered by V-One Corporation, and described in U.S. Pat. No. 5,602,918, herein incorporated by reference. Other systems to which the invention is applicable include SSL ticket-based key exchange procedures and procedures based on the Diffie-Hellman method.

For example, in the SmartGate™ system, which is described herein in order to illustrate one particular application of the invention, and is not intended to be limiting, the client initiating the communication sends its user ID via a client node to an authentication server, which retrieves a shared secret key associated with the user ID and responds by sending a clear text first random number to the client node. The client node encrypts, using a token which may be secured by a smartcard or provided in software on the client's computer, the first random number and in turn generates a second random number, sending the encrypted first random number back to the authentication server for authentication by the authentication server of the client node and the clear text second random number back to the authentication server so that the authentication server can encrypt it using its shared secret key and send it back to the client node for authentication of the authentication server by the client node. The session key in this system is generated by symmetrically encrypting, using the shared secret keys, combinations of the clear text random numbers generated by the parties using the shared secret key which each party has verified to be possessed by the other party to the communication. In order to recover the session keys thus generated, it is simply necessary to have the authentication server retrieve its shared secret key and apply it to the recorded clear text random numbers.

On the other hand, in an alternative method of using session keys to protect communications, the session key is generated by one of the parties based on exchanged clear text data during the handshaking procedure, and transmitted to the other party by encrypting it with the public key of the other party to form an authorization ticket, which is then decrypted by the other party using the private key of the other party. In that case, in order to recover the session key using the principles of the invention, the key recovery agent supplies the original ticket, which has been recorded, to the party having the private key necessary to decrypt the ticket, and has the party decrypt it to obtain the session key.

In either case, the session key is recovered based on a recording of the handshaking procedure used to generate the session key, and application of a recreation of the procedure to the recording. For purposes of the present invention, the important point of the mutual authentication and session key generating process used by the SmartGate™ example is that there are three elements necessary to generate the session key, namely the two random numbers which are transmitted in clear text form during the session key generating handshaking procedure, and a shared secret key which is not transmitted, but which are present in a database accessible by the authentication server based on the user identification provided at the initiation of the handshaking procedure. On the other hand, in the case of A Diffie-Hellman, SSL, or other public/private cryptosystem-based key exchange procedure, the principles of the invention may be applied to a recording of the original ticket containing the session key and cooperation of the authentication server of the ticket to decrypt the recorded ticket using its private key and recover the session key.

The main practical difficulties in implementing this concept are the need for limiting access to key recovery communications containing sensitive information to parties certified for involvement in the key recovery process, establishing an audit trail, and protecting the communications between the certified parties. These problems are also addressed by the present invention, through the use of individual password-accessed hardware tokens which store strong encryption keys for the individual certified parties, and which are used to protect network communications and authenticate the parties, with initial entry being provided by a password-accessed hardware token common to all "customer" personnel involved in key recovery.

SUMMARY OF THE INVENTION

It is accordingly an objective of the invention to provide a system and method which permits international customers to obtain from a U.S. vendor strong encryption algorithms for protection of transactions using an authentication server to protect network communications.

It is also an objective of the invention to provide a key recovery system and method which provides the owner of an authentication server with the ability to re-create a session key for a recorded session and provide a means of law enforcement access which complies with U.S. Government strong encryption software export regulations while protecting the secret keys used to generate the session key and eliminating the need for a trusted third party or a key recovery key prepended to the encrypted data file.

It is yet another objective of the invention to provide a key recovery system and method that can be used in connection with existing strong encryption software, and which provides access to legal authorities without the need for modifying the existing strong encryption software, so as to enable any strong encryption software involving exchange of clear text data (or data readily convertible into clear text data), and secret or private keys accessible to a key recovery agent, to meet U.S. Government export requirements and/or, in the case of existing domestic installations, easily be made accessible to investigations or audits.

These objectives are accomplished, in accordance with the principles of the invention, by providing key recovery software designed to run on a general purpose computer such as a laptop or notebook computer, and which utilizes a recording of the original key exchange or key generation procedure as the basis for recreating the original key exchange or key generation procedure. This is accomplished by using secured and authenticated communications between the key recovery software and the server holding the information necessary to recover the session keys. Depending on the method used to encrypt the session data, the key recovery software can either request that the authentication server supply the session key generating secret keys or session key extracting decryption keys to the key recovery software so that the key recovery software can then generate the session key based on the information obtained from the authentication server or, in the case of a public/private cryptosystem-based key exchange procedure such as Diffie-Hellman or SSL, the ticket information obtained from the recorded session protocol may itself be encrypted in the key recovery application's private key and sent directly to the authentication server for recovery, with the recovered session key being encrypted in the key recovery software user's public key, and returned to the key recovery software. In an especially preferred embodiment of the invention, smartcards are used to protect the private keys or certificates used to identify persons involved in key recovery, authenticate their tokens, and encrypt communications with the authentication server involving the key recovery effort, the communications in general being limited to requests for the secret key used to generate the original session key or for decryption of the original ticket containing the session key, and to establishment of an audit trail necessary to comply with the export regulations.

Under the current regulatory scheme, a customer security officer (CSO) must be approved by BXA but may be assigned by the customer, and is responsible for implementation and enforcement of all operational security policies involving the encryption software. In addition, all key recovery agents must be approved by BXA, with the CSO and all KRAs being issued public key certificates by an officially approved certificate authority (CA) working with a local registration authority (LRA) and vendor administrator, the public key certificates containing identity information, the assigned role, and the BXA approval code, with each of these attributes being verified at every point in the system where the identity is authenticated to ensure that only properly authorized personnel are performing their proper tasks.

In summary, the invention provides a session key recovery process controlled by the owner of the authentication and/or encryption server that provides the encryption services used in the encryption process, enabling the secret keys to remain secure, and preventing suspect users from either having knowledge of the investigation or tampering with key recovery ability. By retaining complete control of the recovery process, and using unique session keys for each session, the customer or owner of the authentication server has no concern for government monitoring of other Internet traffic or any intervention in their internal affairs other than revealing the particular session under suspicion.

Finally, it will be appreciated that the system and method of the invention can also be used as a quality control or audit tool for ensuring proper use of a network, or to conduct an internal investigation of suspected fraudulent or other inappropriate activity, in which case some of the audit trail and security features may not be required.

DETAILED DESCRIPTION OF THE PREFERRED EMBODIMENTS

Figure 1:
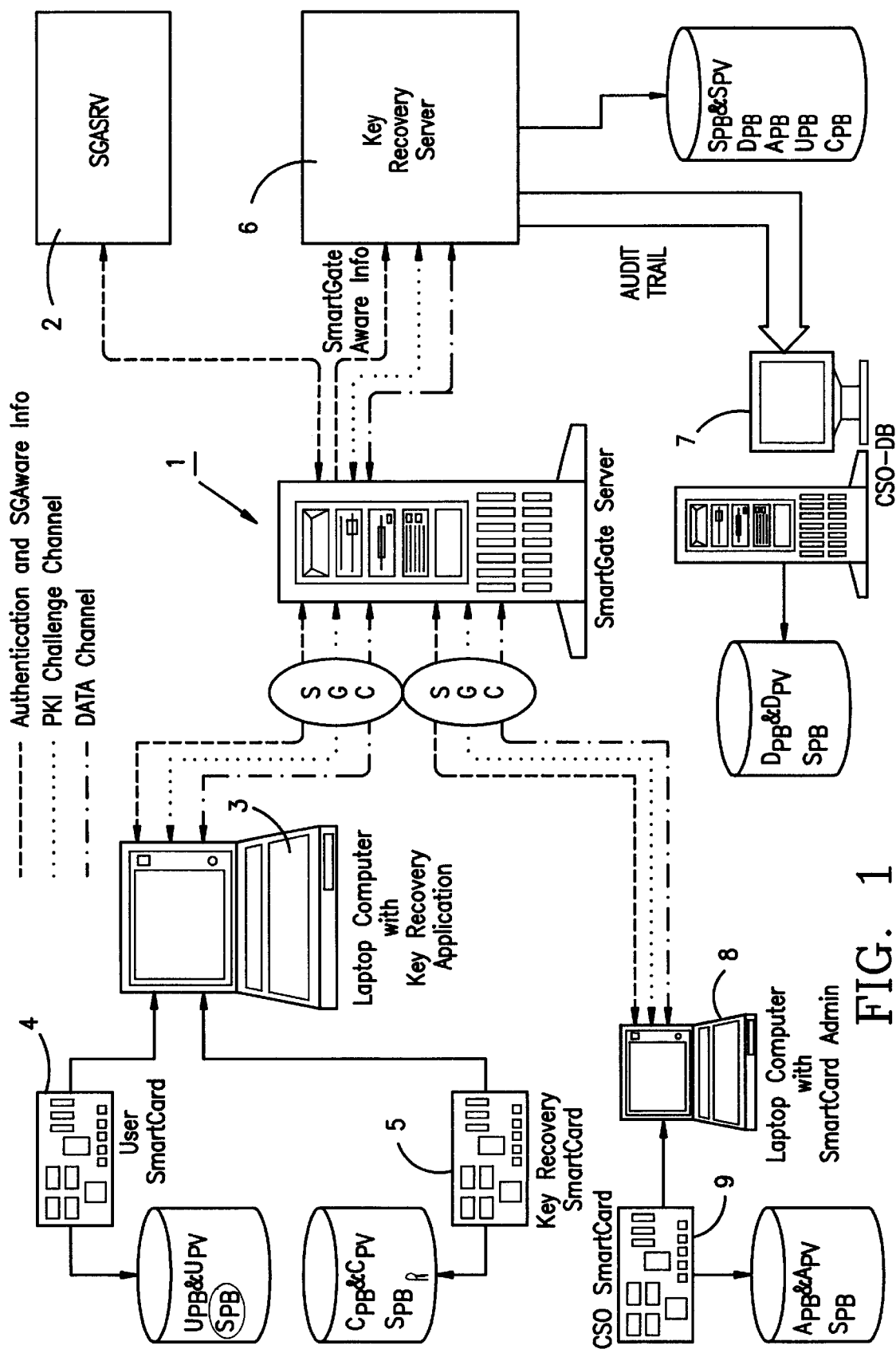
FIG. 1 is a block diagram illustrating the principles elements of a key recovery system constructed in accordance with the principles of a preferred embodiment of the invention.

As illustrated in FIG. 1, a system constructed in accordance with the principles of the invention includes a network server 1 such as the authentication and encryption server described in U.S. Pat. No. 5,602,918, capable of securing communications using an encryption algorithm such as RC4/40 bit, DES, RC4/128 bit, 3DES, or any other standard or proprietary algorithm and which includes a communications authentication and encryption protocol layer 2 capable of secured communications with any of a plurality of client computers.

The system of the preferred embodiment also includes a computer 3 provided with key recovery application software and a smart card reader capable of reading a smart card 4 containing public and private keys $U_{PB}$, $U_{PV}$ unique to an individual key recovery agent, and a recovery server public key $S_{PB}$, and a smartcard 5 containing customer private and public keys $C_{PB}$, $C_{PV}$ common to all users of the laptop. A corresponding application program 6 shares server 1 with communications layer or program 2 and is referred to as the key recovery server since it manages public key $D_{PB}$ used in communicating with a computer 7 administered by the CSO for archiving the audit trail, public key $A_{PB}$ used in communicating with a smartcard administrative laptop computer 8 having a reader for receiving smartcard 9 which permits the CSO to perform such administrative functions as key updating or replacement, public key $U_{PB}$ used in communicating with the key recovery agent's computer 3 in conjunction with token 4, and public key $C_{PB}$ used in communicating with computer 3 in conjunction with token 5. Key recovery server 6 also manages its own private public key pair $S_{PB}$, $S_{PV}$.

The key recovery authentication server 6 may be in the form of a software module added to the authentication server 1 in order to provide a means for enabling key recovery computer 3 to request service that utilize secret information kept inaccessible by the authentication server, such as shared secret keys stored by client ID number, or decryption of tickets containing a session key.

Key recovery computer 3 is preferably a laptop or notebook computer capable of running the session key recreation program. Unlike other client computers which may use software identification tokens containing the secret keys used in generation of a session key, authorization or authentication ticket, or the like, key recovery computer 3 is required to use tokens stored on smartcards or similar hardware devices such as DataKeys or other hardware tokens that prevent copying or extraction of the private key by hackers.

The key recovery computer 3 is preloaded with the key recovery software for supply to the customer as a turnkey system. It may run on a common operating system such as the Microsoft Corp. Windows 95™ operating system, or any other operating system convenient to the user, and also contains an authentication and encryption program such as the SmartGate™ client program preferably adapted for use with a strong encryption such as 3DES, together with a TCP/IP or similar connection using a LAN card in order to communicate with the server and retrieve secret keys and/or other information necessary to recreate the original session key generation or exchange procedure.

The key recovery application program itself is encrypted on the hard disk of key recovery computer 3, or on another mass storage medium such as a Bernoulli disk or optical disk. Preferably, the entire directory containing the application is encrypted with a special encryption program such as V-One's SmartFile™ program so that the application can only be run using a decryption key stored on a smartcard provided to the customer for this purpose. Access to the decryption key is preferably by means of a password known to all key recovery agents authorized to use the key recovery computer, with the password being provided by and periodically changed as necessary by the CSO using computer 8. For best security, all passwords used by the system should be at least eight characters in length, neither all alphabetic nor numeric, and include at least one non-alphanumeric chracter to discourage dictionary attacks, with the smartcard being programmed to self-destruct after a predetermined number of unsuccessful attempts to access the private key, and a backup copy available from the CSO.

When operation of the application software terminates upon recovery and use a session key to decrypt a message, the decrypted copy of the directory is immediately deleted from the system and overwritten to prevent extraction. The process of starting the application including the decryption and deletion processes should be as transparent to the user as possible, with a prompt for insertion of the customer smartcard and the customer password that protects the keys being the only interaction necessary to begin the application.

Figure 2:
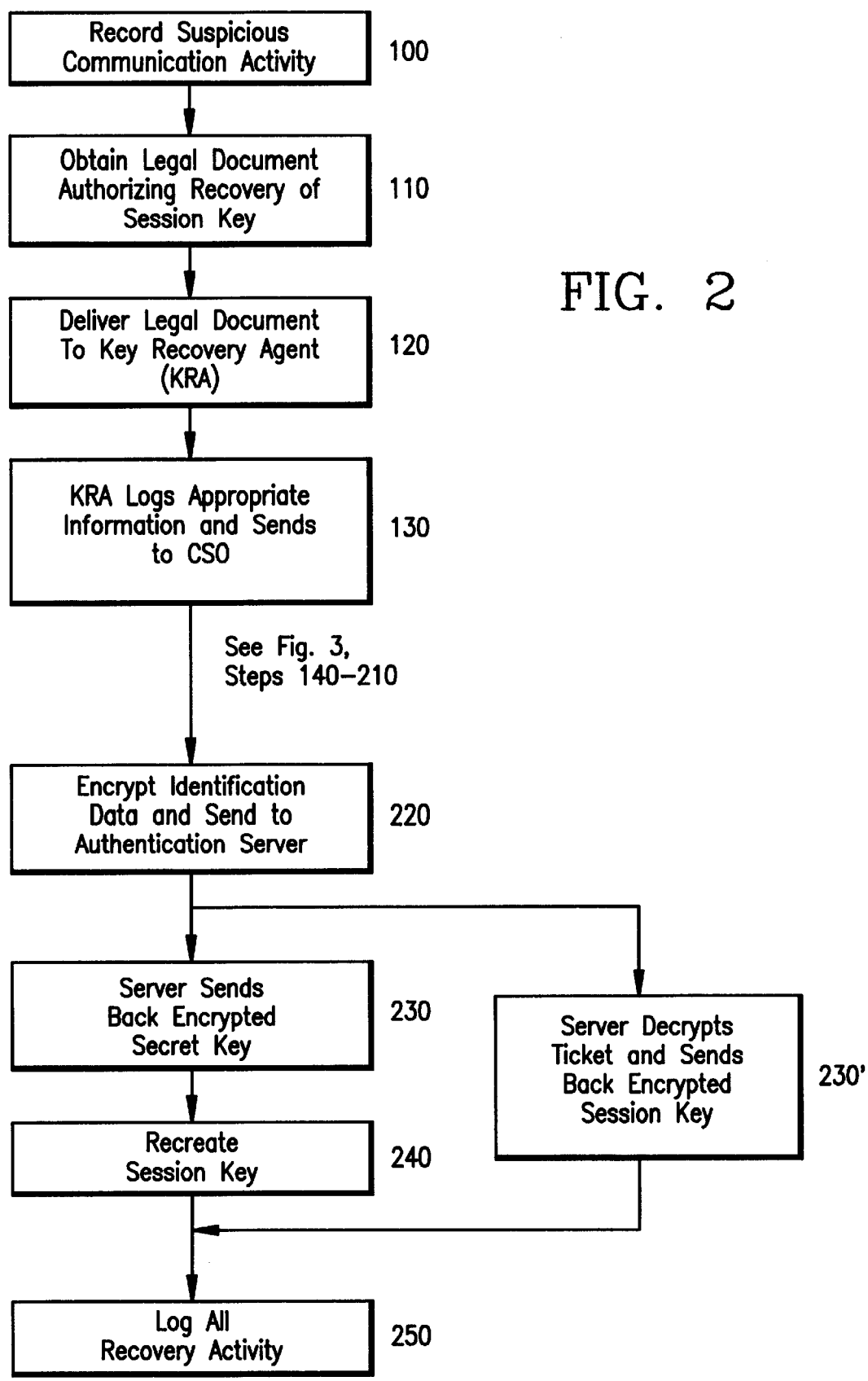
FIG. 2 is a flowchart of a method arranged according to the principles of the preferred embodiment.
Figure 3:
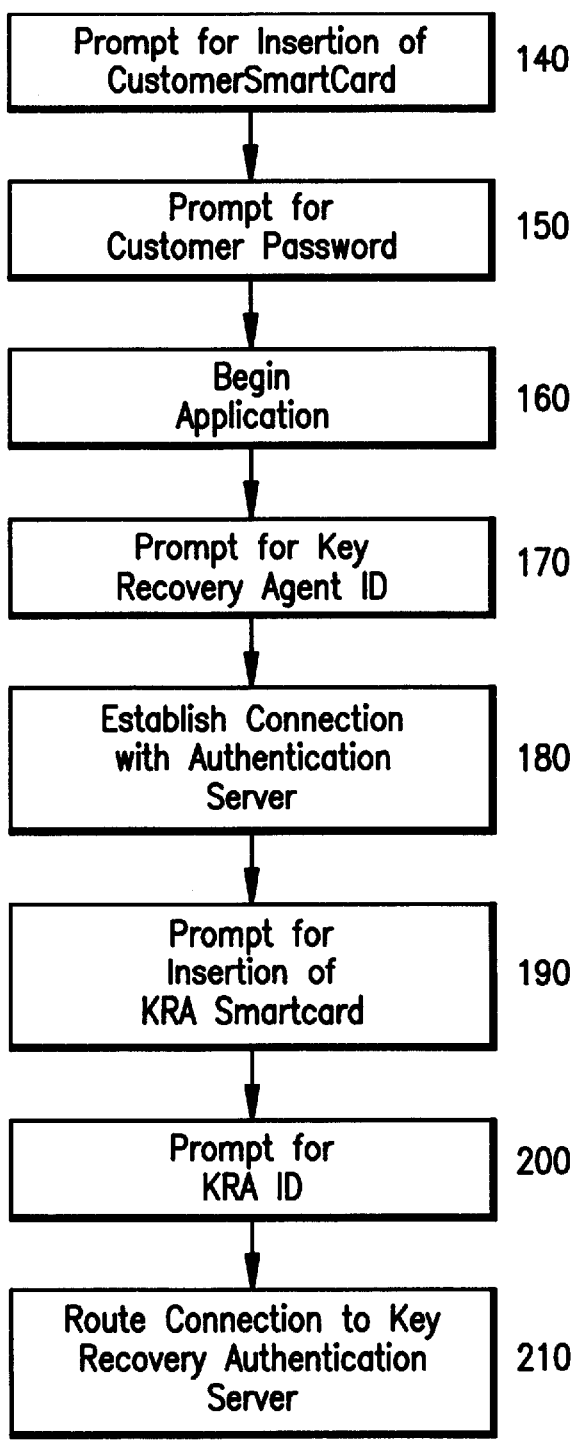
FIG. 3 is a flowchart illustrating the manner in which persons involved in the key recovery operation are authenticated.

As illustrated in FIG. 2, the method of the invention is invoked when a law enforcement agent (LEA) or other authorized party, such a system auditor, becomes suspicious of a particular user's communication activity. Examples might include fraudulent or illegal transactions, money laundering, or other controlled activity. The LEA then records the suspect communications session or sessions (step 100) using techniques such a wiretaps, sniffers on LANs, and the like. The recorded session or sessions are transcribed to a floppy disk or other portable storage medium, with delineation of the traffic including the source of the transmission, channel/port, and so forth.

Depending on local law, the LEA then obtains any legal documentation necessary to require recovery of the session key necessary to decrypt the recorded session data (step 110), and delivers the documentation and recorded session to a designated key recovery agent or KRA (step 120). The KRA then logs the appropriate information for the purpose of establishing an audit trail (step 130), including the date and time of the recovery operation, the KRA name and certificate, details about the purpose of the exercise, who initiated the request for recovery, who approved the request, and information on the recorded session, including the source of the session (file name and media), the recorded time interval, and the disposition of the recorded file. This data is preferably wrapped in the public key of the CSO and sent through a secured connection to computer 7 controlled by the CSO. The CSO records the audit information and keeps it for a period required by applicable law, five years under the current export regulations. If the CSO is not on-line, the session may be terminated and an error message logged on the key recovery computer. To view the audit information, the CSO may use the same reader used by the key recovery agent and authorized third parties to view the information.

Once the recovery session is begun, the application software establishes a connection to the key recovery server or module and insertion of the key recovery agent's unique smartcard 4 is requested (step 140), after which the key recovery agent is prompted for a password to enable access to the card (step 150). After the key recovery application has begun (step 160), the key recovery agent has been prompted for his or her identification (step 170), and a connection with the authentication server established (step 180). The key recovery agent is then prompted for insertion of his or her smartcard (step 190) and a password (step 200), so that the key recovery agent can be authenticated based on data contained in the smartcard, after which the authentication server routes the connection to the appropriate key recovery authentication server (step 210), i.e., the server holding the necessary information to recover the session key of the recorded session, and the information necessary to complete recovery of the session key based on the recorded information is exchanged under protection of the key recovery agent's and key recovery server's public and private keys. In the case of a shared secret key session key generation protocol, the shared secret key for the recorded session is supplied by the server (step 230) for use in recreating the session key based on the recorded clear text random numbers (step 240), while in the case of key exchange procedures based on public key encryption of the session key to form a ticket, the server's private key is used to decrypt the ticket and the decrypted ticket is secured and sent back to the key recovery agent's computer 3 (step 230') for application of any additional algorithms or of recorded clear text data in order to recover the session key from the decrypted ticket.

In an especially preferred embodiment of the invention, public key certificates are used to enforce requirements that strong security only be delivered to approved customers. The certificates contain identity information, the assigned role, and the BXA approval code, and these attributes are verified at every point in the system where the identity is authenticated to ensure that only properly authorized personnel are performing their proper tasks, with the CSO administering the key recovery module or server to maintain a database or access control list (ACL) of authorized parties identified by their certificates. The public key certificates are stored in a directory on the key recovery computer 3, and include certificates for the KRAs, the CSO, the CA, the Customer key, and probably the administrator of the software supplier, as well as a certificate of the LEA if available, although if the latter is not available, a public key pair could be generated on the spot, and a temporary certificate containing information from the LEA's ID and legal documents, and signed by the KRA, could be included in the audit log in order to protect the KRA from liability.

The private keys corresponding to the certificates are protected by the smartcards for the corresponding approved persons. Initial communications with the authentication server can be established using the customer private key, to ensure that only a computer 3 or 8 approved for the customer is used, as opposed to for example a key recovery agent's or CSO's home computer, and further communications with the key recovery server are verified, as appropriate, using the respective private keys unique to the communicating party.

In order to comply with U.S. export regulations, the client which handles communications with the authentication server, referred to as SmartPass™ when supplied by V-One Corporation as part of SmartGate™, may optionally be arranged to periodically retransmit the session ticket containing the authentication information as often as necessary to comply with the regulations, in order to ensure that the necessary information can be recovered. Alternatively or additionally, the session key used to transmit the session ticket could be periodically changed in order to better protect the data transmitted and still enable an investigator to begin capture of a suspected session in mid stream.

Finally, registration of the application software involves nomination by the customer of personnel who will perform CSO and KRA activities, with each registrant providing his or her name, title, address, telephone number, e-mail address, and potential role (CSO, KRA, customer). The registrants then enter randomizing data that is used to generate key pairs, selects a password to protect his or her private key, the private key is written to his or her smartcard, the CSO digitally signs KRA and customer certificate request, and the authorizing salesperson signs the CSO's certificate request, and the entire package is sent to an administrating official for forwarding to BXA. After approval, the smartcards, laptop computers with preloaded software, including respective certificates, and key recovery server software, are all packaged and made available to the customer for use whenever an access request is made by an appropriate authority.

Having thus described a preferred embodiment of the invention in sufficient detail to enable those skilled in the art to make and use the invention, it is nevertheless intended that the above description not be taken as limiting, but rather that the invention be defined solely by the appended claims.

What is claimed is:

1. A key recovery system by which a key recovery agent recovers a session key used to encrypt a message, comprising:
   means for the key recovery agent to replay a recorded communication between the sender of the message and an authentication server, said session key having been generated with assistance of said authentication server during said communication;
   means for the key recovery agent to request the authentication server to assist in recovering the session key for use by the key recovery agent to decrypt said message, said authentication server thereupon recovering the session key from said recorded communication by recreating a process by which the session key was originally generated utilizing secret information accessible only by the authentication server;
   means for the authentication server to authenticate said request by the key recovery agent to assist in recovering the session key; and
   means for transmitting said session key from the authentication server to the key recovery agent in order to decrypt said message.

2. A key recovery system as claimed in claim 1, wherein said authentication server is an authentication server on a client/server network, and said secret information is stored in a database accessible only by the authentication server.

3. A key recovery system as claimed in claim 2, wherein said means for the key recovery agent to replay said recording of the session and request the authentication server to assist in recovering the session key include an applications program on a client computer connected via said client/server network to said authentication server.

4. A key recovery system as claimed in claim 3, wherein said client computer is a laptop or notebook computer.

5. A key recovery system as claimed in claim 3, wherein said means for the authentication server to authenticate said request includes means on said authentication server for cooperating with a token reader connected to said client computer to authenticate a token containing authenticating information unique to the key recovery agent in order to verify the identity of said key recovery agent.

6. A key recovery system as claimed in claim 5, wherein said token is contained on a smartcard.

7. A key recovery system as claimed in claim 6, wherein communications with said server are initially established by cooperation between said authentication server and a second customer smartcard containing authenticating information unique to the key recovery system.

8. A key recovery system as claimed in claim 6, wherein said smartcard has stored thereon an authentication certificate signed by a certification authority.

9. A key recovery system as claimed in claim 1, wherein said recorded communication includes data that has been encrypted by a public key of the party to the communication, wherein said secret information is a private key of the authentication server that can be used to decrypt said data, and wherein said authentication server includes means for decrypting said data by means of said private key.

10. A key recovery system as claimed in claim 1, wherein said recording includes first and second numbers unique to the session, and wherein said secret information is a secret key used to encrypt a combination of said first and second numbers in order to generate said session key.

11. A key recovery system as claimed in claim 1, further comprising means for transmitting information concerning a key recovery to a security officer of a customer of said encryption software in order to establish an audit trail and meet archiving requirements.

12. A key recovery method in which a key recovery agent recovers a session key used to encrypt a message, comprising the steps of: replaying, at the key recovery agent, a recorded communication between a sender of the message and an authentication server, said session key having been generated with assistance of the authentication server during said communication;
   requesting, by the key recovery agents the authentication server to assist in recovering the session key, said authentication server thereupon recovering the session key from said recorded communication by re-creating a processing by which said session key was originally generated utilizing secret information accessible only by the authentication server;
   authenticating, at the authentication server, said request by the key recovery agent to assist in recovering the session key; and
   transmitting said session key from the authentication server to the key recovery agent in order to decrypt said message.

13. A key recovery method as claimed in claim 12, wherein said authentication server is an authentication server on a client/server network, and wherein said step of recovering the session key comprises the step or retrieving said secret information from a database accessible only by the authentication server.

14. A key recovery method as claimed in claim 13, wherein the steps of replaying, at the key recovery agents said recording of the session and requesting, by the authentication server, to assist in recovering the session key based on the recovered data include the step of running an applications program on a client computer connected via said client/server network to said authentication server.

15. A key recovery method as claimed in claim 14, wherein said step of running an applications program on a client computer includes the step of running the applications program on a laptop or notebook computer.

16. A key recovery method as claimed in claim 14, wherein said step of authenticating, at the authentication server, said request includes the step of authenticating, in cooperation with a token reader connected to said client computer, a token containing authenticating information unique to the key recovery agent in order to verify the identity of said key recovery agent.

17. A key recovery method as claimed in claim 16, wherein said step of authenticating said token includes the step of retrieving said token from a smartcard.

18. A key recovery method as claimed in claim 17, wherein communications with said server are initially established by cooperation between said authentication server and a second customer smartcard shared by multiple key recovery agents.

19. A key recovery method as claimed in claim 17, wherein said said step of retrieving said token from a smartcard includes the step of retrieving an authentication certificate signed by a certification authority.

20. A key recovery method as claimed in claim 12, wherein said recorded communication includes a recorded ticket containing said session key and said secret information is a private key of the authentication server, and wherein said step of recovering the session key includes the step of decrypting, by said authentication server, said recorded ticket upon accessing a database containing said private key.

21. A key recovery method as claimed in claim 12, wherein said step of replaying said recording includes the step of recovering first and second numbers unique to the session, said secret information including a secret key used to encrypt a combination of said first and second numbers in order to generate said session key.

22. A key recovery method as claimed in claim 12, further comprising the step of transmitting information concerning a key recovery to a security officer of a customer of said encryption software in order to establish an audit trail and meet archiving requirements.

23. A key recovery system as claimed in claim 1, wherein said communication includes a ticket generated using a public/private cryptosystem-based key exchange procedure, and further comprising means for encrypting ticket information obtained from a recorded session protocol using a private key of a key recovery application's private key, and means for sending the encrypted ticket information to the authentication server for recovery, and wherein the means for transmitting said session key from the authentication server to the key recovery agent in order to enable the recovery agent to decrypt said message includes means for encrypting a recovered session key in a public key of a user of the key recovery agent, and means for returning the recovered session key to the key recovery system.

24. A key recovery method as claimed in claim 12, wherein said recording includes a ticket generated using a public/private cryptosystem-based key exchange procedure, and further comprising the steps of encrypting ticket information obtained from a recorded session protocol using a private key of a key recovery application's private key, and sending the encrypted ticket information to the server for recovery, and wherein the step of transmitting the session key to the recovery agent includes the steps of encrypting a recovered session key in a public key of a user of the key recovery agent, and returning the recovered session key to the key recovery agent.

25. A key recovery system as claimed in claim 1, wherein said authentication server is arranged to authenticate said key recovery agent based on a first token carried by and containing information unique to the key recovery agent, and to authenticate a computer used by the key recovery agent based on a second token associated with the computer and containing information unique to the key recovery system.

26. A key recovery system as claimed in claim 25, wherein said second token is contained in smartcards common to multiple key recovery agents.

27. A key recovery system as claimed in claim 25, further comprising an additional smartcard used by a chief security officer to establish communications with the authentication server in order to update secret keys used in authenticating said first and second tokens.

28. A key recovery system as claimed in claim 1, wherein said means for transmitting said session key from the authentication server to the key recovery agent includes means for encrypting the transmitted session key by a public key of the key recovery agent, a public key associated with a computer used to establish communications with the authentication server, and a private key of the authentication server, whereby the session key can only be recovered by a key recovery agent having a first token containing a private key corresponding to the public key of the key recovery agent and a second token containing a private key corresponding to the public key associated with the computer, and whereby encryption by the private key of the authentication server authenticates the authentication server.

29. A key recovery method as claimed in claim 12, wherein said step of authenticating, at said authentication server, said request by said key recovery agent includes the steps of authenticating said key recovery agent based on a first token carried by and containing information unique to the key recovery agent, and authenticating a computer used by the key recovery agent based on a second token associated with the computer and containing information unique to the key recovery system.

30. A key recovery method as claimed in claim 29, wherein step of authenticating a computer used by the key recovery agent includes the step of authenticating said computer includes the step of retrieving said second token from a smartcard common to multiple key recovery agents.

31. A key recovery method as claimed in claim 12, wherein said step of transmitting said session key from the authentication server to the key recovery agent includes the steps of encrypting the transmitted session key by a public key of the key recovery agent, a public key associated with a computer used to establish communications with the authentication server, and a private key of the authentication server, whereby the session key can only be recovered by a key recovery agent having a first token containing a private key corresponding to the public key of the key recovery agent and a second token containing a private key corresponding to the public key associated with the computer, and whereby encryption by the private key of the authentication server authenticates the authentication server.

* * * * *